(12) United States Patent
Amrhein et al.

(10) Patent No.: US 9,161,169 B2
(45) Date of Patent: Oct. 13, 2015

(54) USING LOCATION AND PROPENSITY BASED PREDICTIVE ANALYTICS TO PROVIDE MOBILE MESSAGE QOS

(71) Applicant: International Business Machines Corporation, Armonk, NY (US)

(72) Inventors: Dustin K. Amrhein, Zachary, LA (US); Douglas C. Berg, Rochester, MN (US); Nitin Gaur, Round Rock, TX (US); Christopher D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 14/146,502

(22) Filed: Jan. 2, 2014

(65) Prior Publication Data

US 2015/0189474 A1 Jul. 2, 2015

(51) Int. Cl.
*H04W 4/02* (2009.01)
*H04L 29/08* (2006.01)

(52) U.S. Cl.
CPC ............. *H04W 4/025* (2013.01); *H04L 67/306* (2013.01)

(58) Field of Classification Search
CPC .... H04W 8/005; H04W 64/00; G06F 3/0484; G06F 3/04817; G06F 3/0488; G01C 21/36
USPC ................. 455/456.3, 435; 715/751; 709/217
See application file for complete search history.

(56) References Cited

U.S. PATENT DOCUMENTS

| | | | |
|---|---|---|---|
| 7,133,420 B2 | 11/2006 | Chang et al. | |
| 8,271,313 B2 | 9/2012 | Williams | |
| 8,401,887 B2 | 3/2013 | Moukas | |
| 8,407,148 B2 | 3/2013 | Yoder | |
| 2002/0035605 A1 | 3/2002 | McDowell | |
| 2010/0262487 A1 | 10/2010 | Edwards et al. | |
| 2010/0280904 A1 | 11/2010 | Ahuja | |

(Continued)

FOREIGN PATENT DOCUMENTS

WO 2008041871 4/2008

OTHER PUBLICATIONS

Butcher, D.; "Location-based marketing can increase average order value, frequency, loyalty"; The Mobile Marketer; Mar. 29, 2011.

(Continued)

*Primary Examiner* — Phuoc H Doan
(74) *Attorney, Agent, or Firm* — North Shore Patents, P.C.; Michele Liu Baillie (57) ABSTRACT

In the sending messages, a notification system determines locations of mobile devices and user profiles for users of the mobile devices, identifies a target message for a target device, determines a number of users with overlapping target message candidacy based on the locations and the user profiles, and determines whether the number of users exceed a predetermined threshold. If the number of users exceeds the predetermined threshold, the notification system determines a target message trigger time based on when the number of users exceed a predetermined threshold, determines a target message assembly time and a target message delivery time, and determines whether a sum of the target message assembly time and the target message delivery time is less than a difference between a current time and the trigger time. If so, then a sending of the target message to the target device for displaying at the target device is triggered.

18 Claims, 4 Drawing Sheets

(56) References Cited

U.S. PATENT DOCUMENTS

2011/0246907 A1* 10/2011 Wang et al. .................. 715/751
2012/0072529 A1*  3/2012 Ahopelto ...................... 709/217
2012/0323687 A1  12/2012 Schuster et al.
2013/0115972 A1   5/2013 Ziskind et al.

OTHER PUBLICATIONS

"Top 10 Ways to Optimize Your Mobile Marketing Efforts"; The Mobile Marketer; May 1, 2013.

* cited by examiner

USING LOCATION AND PROPENSITY BASED PREDICTIVE ANALYTICS TO PROVIDE MOBILE MESSAGE QOS

BACKGROUND

Current approaches to sending messages to devices, including mobile devices, commonly use location based predictive analytics. However, these approaches lack a mechanism to discern the effectiveness of the messages that are sent. For example, these approaches lack a mechanism to discern from a preferential category of messages to either the most valued customer or to customers most likely to avail of an offer contained in the messages, using factors in combination with the customer's location. This may result in a high cost in the sending of the messages, especially in the sending of a high volume of messages, without a corresponding assurance that the most valued customers receive the messages in a timely fashion.

SUMMARY

According to one embodiment of the present invention, a method for sending messages, comprises: determining locations of a plurality of mobile devices and user profiles for a plurality of users of the plurality of mobile devices; identifying at least one target message for at least one target device; determining, by a computing processor, a number of users with overlapping target message candidacy based on the locations and the user profiles; and determining whether the number of users exceed a predetermined threshold. In response to determining that the number of users exceed the predetermined threshold, the method comprises: determining, by the computing processor, a target message trigger time based on when the number of users exceed a predetermined threshold; determining, by the computing processor, a target message assembly time for assembly the target message and a target message delivery time for delivering the target message to the target device; determining whether a sum of the target message assembly time and the target message delivery time is less than a difference between a current time and the trigger time; and in response to determining that the sum of the target message assembly time and the target message delivery time is less than the difference between the current time and the trigger time, triggering a sending of the target message to the target device for displaying at the target device.

In one aspect of the present invention, the determining the number of users with overlapping target message candidacy based on the locations and the user profiles comprises: determining the number of users with overlapping locations and user profiles that match one or more predetermined parameters corresponding to the target message.

In one aspect of the present invention, in response to determining that the number of users does not exceed the predetermined threshold, the sending of the target message to the target device is not triggered.

In one aspect of the present invention, in response to the triggering of the sending of the target message to the target device, the target message is assembled and the target message is sent to the target device.

In one aspect of the present invention, the trigger time comprises a start time and a stop time of when the number of users with overlapping target message candidacy exceeds the threshold.

In one aspect of the present invention, the target device comprises the mobile devices of the users with overlapping target message candidacy, wherein the target message is sent to each of the mobile devices of the users with overlapping target message candidacy.

System and computer program products corresponding to the above-summarized methods are also described and claimed herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 1:
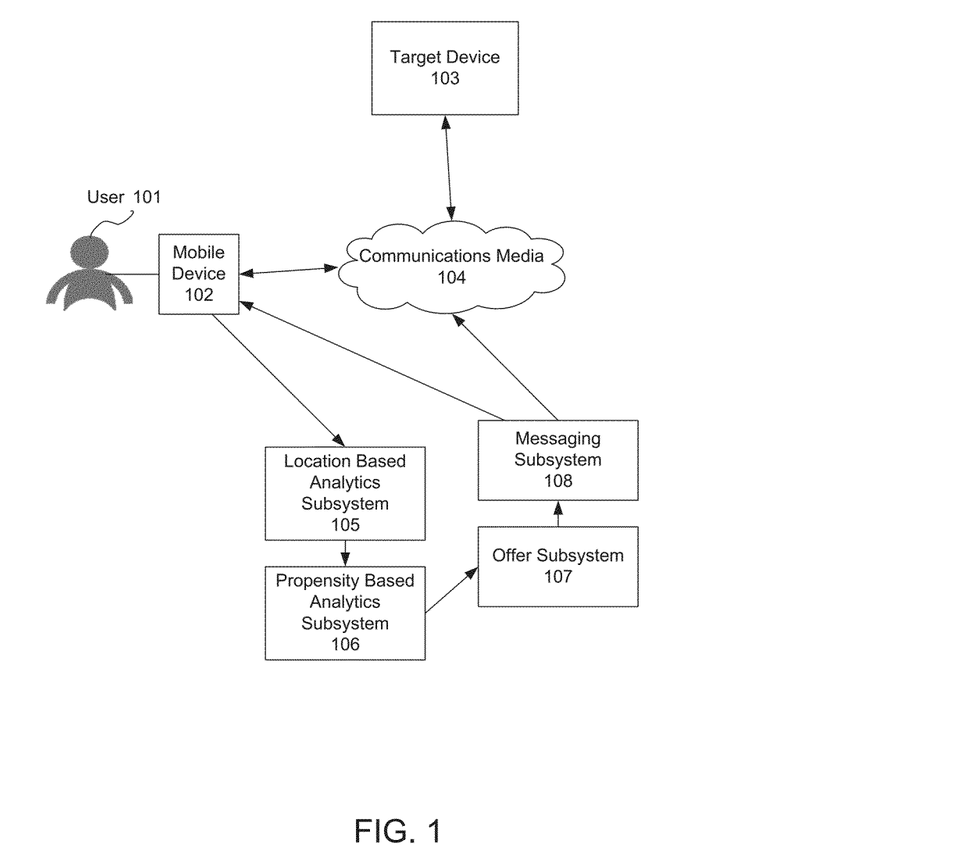
FIG. 1 is a functional block diagram illustrating a system for providing messages according to embodiments of the present invention.

FIG. 1 is a functional block diagram illustrating a system for providing messages according to embodiments of the present invention. The system includes a mobile device 102 utilized by a user 101, a target device 103 for displaying messages, and a notification system that includes a location based analytics subsystem 105, a propensity based analytics subsystem 106, an offer subsystem 107, and a messaging subsystem 108. The mobile device 102 and the target device 103 may communication with the notification system over one or more communications media 104. The mobile device 102 may be any computing device used by the user 101 whose location may be discerned by the location based analytics subsystem 105. The target device 103 can be any computing device capable of displaying messages received over one of the communications media 104, such as a billboard, a display device at a traffic signal or elevator, or a display device on a train or bus. The target device 103 may or may not be a mobile device. The target device 103 may be the mobile device 102. The communications medium 104 may be of any type capable of carrying messages and other data between the mobile device 102, the target device 103, and the notification system. The subsystems 105-108 may be implemented by a single entity or multiple entities. The functions of the subsystems 105-108 are described further below. The mobile device 102, the target device 103 and/or the subsystems 105-108 of the notification system may comprise a computer system as illustrated in FIG. 2.

Figure 2:
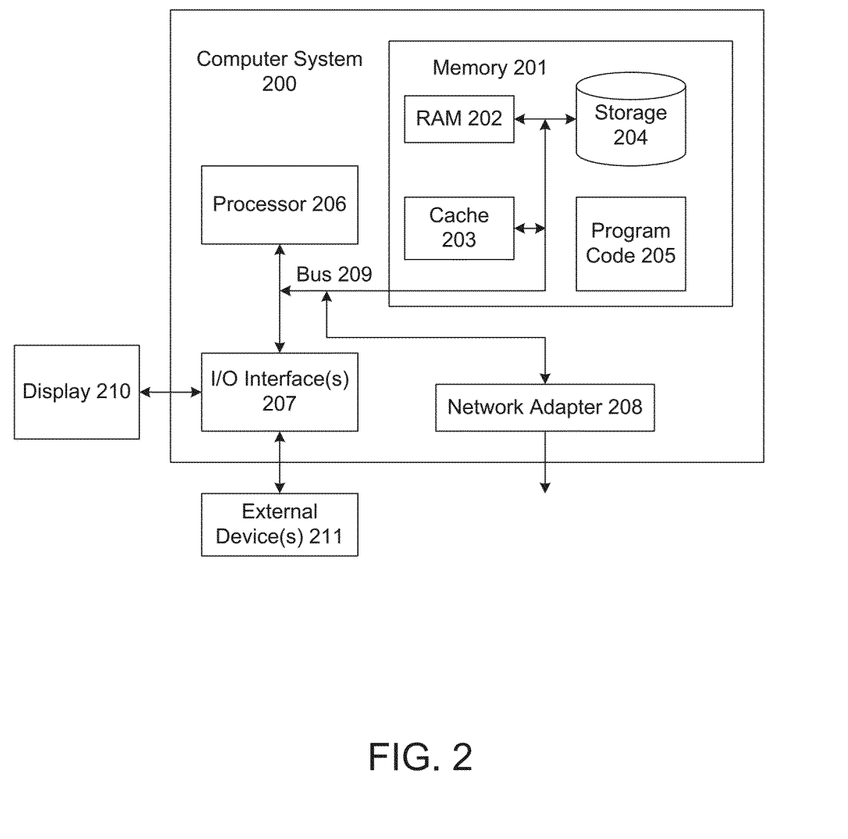
FIG. 2 illustrates a computer system in the system for providing messages according to embodiments of the present invention.

FIG. 2 illustrates a computer system in the system for providing messages according to embodiments of the present invention. The computer system 200 is operationally coupled to a processor or processing units 206, a memory 201, and a bus 209 that couples various system components, including the memory 201 to the processor 206. The bus 209 represents one or more of any of several types of bus structure, including a memory bus or memory controller, a peripheral bus, an accelerated graphics port, and a processor or local bus using any of a variety of bus architectures. The memory 201 may include computer readable media in the form of volatile memory, such as random access memory (RAM) 202 or cache memory 203, or non-volatile storage media 204. The memory 201 may include at least one program product having a set of at least one program code module 205 that are configured to carry out the functions of embodiment of the present invention when executed by the processor 206. The computer system 200 may also communicate with one or more external devices 211, such as a display 210, via I/O interfaces 207. The computer system 200 may communicate with one or more networks via network adapter 208.

Embodiments of the present invention use not only location based predictive analytics, but also the propensity of a user to avail of an offer in a message displayed on the target device 103. For example, in situations where a message can be sent to a large number of potential recipients, the propensity based predictive analytics will prioritize the messages to be sent to either the most valuable users or to users with a high probability of interest in the contents of the message. Embodiments of the present invention prioritizes based on the overlaps in users' locations and user profiles, the time for assembling the message, and the time to deliver the message to the target device 103. In this manner, the costs of high volume messages can be reduced, while the most important clients are ensured to receive the messages in a timely fashion. Delays due to the queuing of large volumes may be avoided. Embodiments of the present invention may be applied to various mobile messaging techniques, including but not limited to push notification servers (PNS), short message service (SMS), and Message Queuing Telemetry Transport (MQTT) messaging infrastructures.

Figure 3:
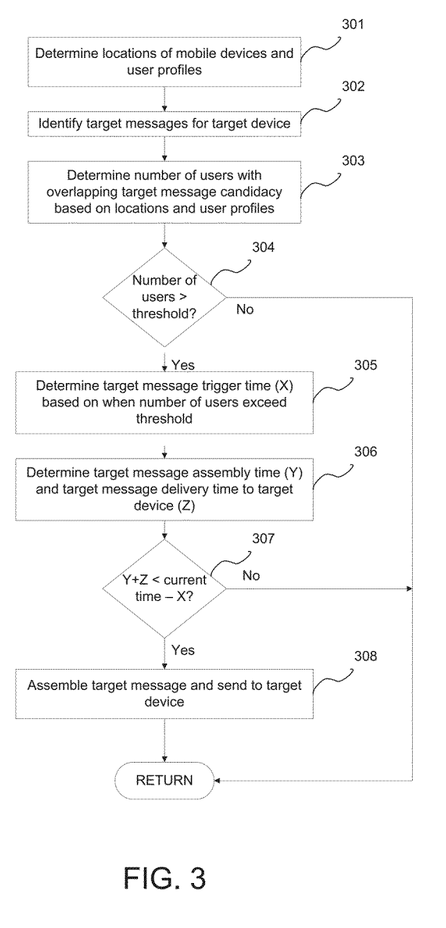
FIG. 3 is a flowchart illustrating a method for providing messages according to embodiments of the present invention.

FIG. 3 is a flowchart illustrating a method for providing messages according to embodiments of the present invention. First, the notification system determines the locations of mobile devices 102 and the user profiles of the users 101 of the mobile devices 102 (301). Location based services may be used to determine the locations of the mobile devices 102, which may include their current location as well as their speeds of travel and trajectory paths. The user profile may indicate a user's interests, as well as historical data, such as history of past messages to which the user responded, vehicle maintenance history, health history, etc. Next, the notification system identifies a target message that can be sent to the target device 103 (302). The notification system determines the number of users with overlapping target message candidacy based on the locations and user profiles obtained in 301-302 (303). In this embodiment, the target message is part of an offer defined by an enterprise. An enterprise may define, for example, the parameters of the offer, the contents of the target messages to be sent, and what location and profile combinations would be considered a match. Mobile device locations may overlap, for example, by being within a predetermined distance from the target device 103 or by being within a predetermined geographical area. Profiles may overlap, for example, when the interests or histories indicated in the profiles of the users match or when they belong to the same category. By using these enterprise-defined parameters, a user may be identified as a target message candidate. In this manner, the relevance and context between the target message and the locations and profiles are taken into consideration.

For example, assume that a husband and wife are in the same car, traveling towards a geographical area defined as relevant to a target message. Both the husband and wife have their smartphones with the location service enabled. Assume here that the smartphones are also the target devices 103. The notification system determines that both users are located within a geographical area matching the target message and further determines from their profiles that the users are husband and wife. The notification system may then identify either the husband's or the wife's smartphone, but not both, as a target message candidate. Thus, only one copy of the target message will be sent to either the husband or the wife's smartphones. This reduces the number of target messages sent, and thus also reduces the costs of implementing the offer to which the target message belongs. This cost savings may be significant when a large number of target messages are to be sent or when the sending of the target message is expensive.

The enterprise may further define a threshold number of users identified as target message candidates for the target message to be sent. Such a threshold may be defined, for example, for messages that are expensive to assemble and/or deliver, and thus the enterprise may wish to ensure that a minimum number of users will be capable of receiving the target message before sending the target message. The notification system compares the number of users with the threshold (304). If the number of users does not exceed the threshold, then the target message will not be sent. If the number of users exceeds the threshold, then the notification system continues by determining the target message trigger time (305) based on when the number of users exceeds the threshold. In this embodiment, the target message trigger time is a start and stop time during which the number of users exceeds the threshold. A variety of known predictive analytic models may be used to determine the trigger time.

For example, assume that the users are soldiers in the military and the target message pertains to information on current field dangers. The notification system determines from their mobile devices that some of the soldiers are located off of the military base. Their profiles indicate that they are on missions to which the current field dangers are relevant. The notification system identifies these soldiers to be target message candidates while the other soldiers are not. In this example, the military may deem this type of target message to be critical and set the threshold at zero. In this manner, the soldiers outside the military base and on the missions are given higher priority than soldiers who are not on a mission or are on the military base.

The notification system also determines a target message assembly time (Y) and a target message delivery time (Z) (306). The target message assembly time is the time required for the notification system to prepare the target message. In this embodiment, the determination of the target message assembly time takes into account internal system conditions, such as system utilization conditions, current throughput performance, etc. The target message delivery time is the time required for the notification system to deliver the target message to the target device 103. In this embodiment, the determination of the target message delivery time takes into account external conditions, such as network constraints, time of day, location of recipients, system delay, etc.

Next, the notification system determines whether the combination of the target message assembly time (Y) and the target message delivery time (Z) is less than the time period between the current time and trigger time (X) (307). In other words, the notification system determines whether the target message can be assembled and delivered to the target device 103 in time for the user 101 to be able to view the target message. If (Y+Z) is more than (current time−X), then the target message cannot be assembled and delivered to the target device 103 in time, and thus the target message will not be sent. Otherwise, the notification system proceeds by assembling the target message and sending the target message to the target device 103 (308).

Figure 4:
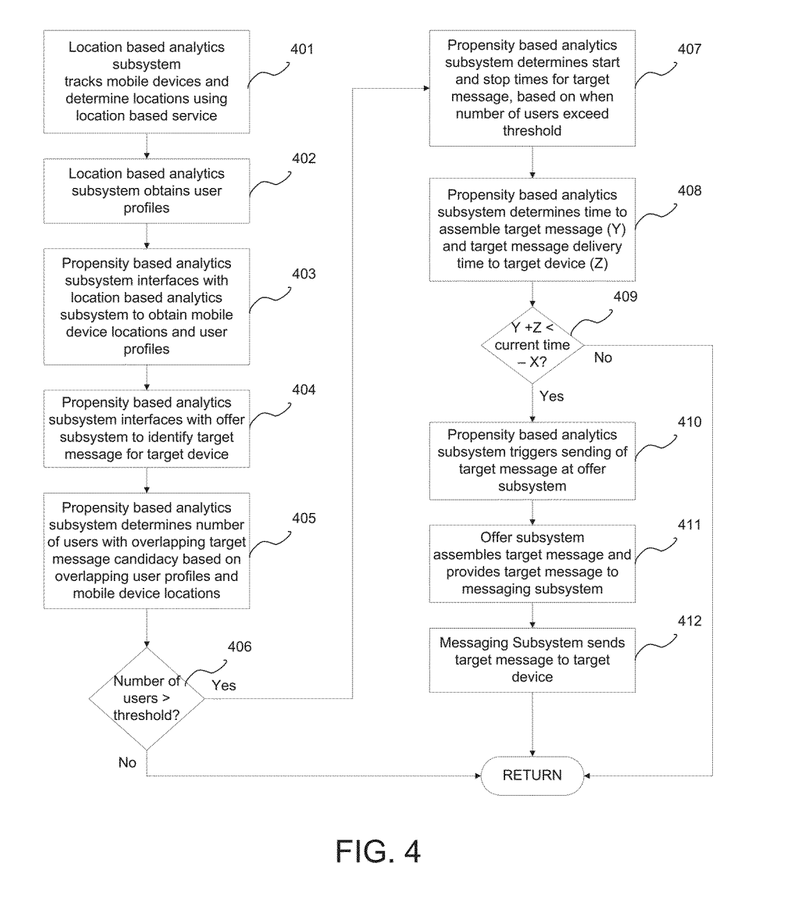
FIG. 4 is a flowchart illustrating in more detail the method for providing messages according to embodiments of the present invention.

FIG. 4 is a flowchart illustrating in more detail the method for providing messages according to embodiments of the present invention. The location based analytics subsystem 105 tracks the mobile devices 102 and determines the locations of the mobile devices 102 using location based services (401). The location based analytics subsystem further obtains user profiles corresponding to the users 101 of the mobile devices 102 (402). The propensity based analytics subsystem 106 interfaces with the location based analytics subsystem 105 to obtain the mobile device locations and the user profiles (403). The propensity based analytics subsystem 106 also interfaces with the offer subsystem 107 to identify a target message for the target device 103 (404). The propensity based analytics subsystem determines the number of users with overlapping target message candidacy based on overlapping user profiles and mobile device locations (405). If the propensity based analytics subsystem 106 determines that the number of users does not exceed the threshold defined by the enterprise (406), then the sending of the target message will not be triggered. If the number of users exceeds the threshold, then the propensity based analytics subsystem 106 determines the start and stop times, i.e., the trigger time (X), for the target message based on when the number of users exceed the threshold, as described above (407). The propensity based analytics subsystem 106 further determines the target message assembly time (Y) and the target message delivery time (Z) (408), as described above. If Y+Z is more than (current time−X) (409), then the sending of the target message will not be triggered. Otherwise, the propensity based analytics subsystem 106 triggers the sending of the target message at the offer subsystem 107 (410). In response, the offer subsystem 107 assembles the target message and provides the target message to the messaging subsystem 108 (411). The messaging subsystem 108 sends the target message to the target device 103 (412) to be displayed. The messaging subsystem 108 may send the messages directly to the target device 103 or may use another mobile system, such as PNS or SMS.

Even though the embodiments of the present invention are described above in the context of one target device, the notification system may consider multiple target devices as candidates to receive the target message. The notification system may use one or more of the factors described above to determine the optimal target device(s) for displaying the target message and select this target device out of the multiple target devices. For example, the notification system may select the target device(s) to which the highest numbers of users are in proximity.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for sending messages, comprising:
   determining locations of a plurality of mobile devices and user profiles for a plurality of users of the plurality of mobile devices;
   identifying at least one target message for at least one target device;
   determining, by a computing processor, a number of users with overlapping target message candidacy based on the locations and the user profiles;
   determining whether the number of users exceed a predetermined threshold; and
   in response to determining that the number of users exceed the predetermined threshold:
      determining, by the computing processor, a target message trigger time based on when the number of users exceed a predetermined threshold;
      determining, by the computing processor, a target message assembly time for assembly the target message and a target message delivery time for delivering the target message to the target device;
      determining whether a sum of the target message assembly time and the target message delivery time is less than a difference between a current time and the trigger time; and
      in response to determining that the sum of the target message assembly time and the target message delivery time is less than the difference between the current time and the trigger time, triggering a sending of the target message to the target device for displaying at the target device.

2. The method of claim 1, wherein the determining the number of users with overlapping target message candidacy based on the locations and the user profiles comprises:
   determining the number of users with overlapping locations and user profiles that match one or more predetermined parameters corresponding to the target message.

3. The method of claim 1, wherein in response to determining that the number of users does not exceed the predetermined threshold, not triggering the sending of the target message to the target device.

4. The method of claim 1, wherein in response to the triggering of the sending of the target message to the target device, assembling the target message and sending the target message to the target device.

5. The method of claim 1, wherein the trigger time comprises a start time and a stop time of when the number of users with overlapping target message candidacy exceeds the threshold.

6. The method of claim 1, wherein the target device comprises the mobile devices of the users with overlapping target message candidacy, wherein the target message is sent to each of the mobile devices of the users with overlapping target message candidacy.

7. A computer program product for sending messages, the computer program product comprising:
   a non-transitory computer readable storage medium having computer readable program code embodied therewith, the program code executable by a processor to:
   determine locations of a plurality of mobile devices and user profiles for a plurality of users of the plurality of mobile devices;
   identify at least one target message for at least one target device;
   determine a number of users with overlapping target message candidacy based on the locations and the user profiles;

determine whether the number of users exceed a predetermined threshold; and in response to determining that the number of users exceed the predetermined threshold:

determine a target message trigger time based on when the number of users exceed a predetermined threshold;

determine a target message assembly time for assembly the target message and a target message delivery time for delivering the target message to the target device;

determine whether a sum of the target message assembly time and the target message delivery time is less than a difference between a current time and the trigger time; and in response to determining that the sum of the target message assembly time and the target message delivery time is less than the difference between the current time and the trigger time, trigger a sending of the target message to the target device for displaying at the target device.

8. The computer program product of claim 7, wherein the program code executable by the processor to determine the number of users with overlapping target message candidacy based on the locations and the user profiles is further executable to:

determine the number of users with overlapping locations and user profiles that match one or more predetermined parameters corresponding to the target message.

9. The computer program product of claim 7, wherein in response to determining that the number of users does not exceed the predetermined threshold, not trigger the sending of the target message to the target device.

10. The computer program product of claim 7, wherein in response to the triggering of the sending of the target message to the target device, assemble the target message and send the target message to the target device.

11. The computer program product of claim 7, wherein the trigger time comprises a start time and a stop time of when the number of users with overlapping target message candidacy exceeds the threshold.

12. The computer program product of claim 7, wherein the target device comprises the mobile devices of the users with overlapping target message candidacy, wherein the target message is sent to each of the mobile devices of the users with overlapping target message candidacy.

13. A system comprising:

a processor; and a non-transitory computer readable storage medium having computer readable program code embodied therewith, the program code executable by the processor to:

determine locations of a plurality of mobile devices and user profiles for a plurality of users of the plurality of mobile devices;

identify at least one target message for at least one target device;

determine a number of users with overlapping target message candidacy based on the locations and the user profiles;

determine whether the number of users exceed a predetermined threshold; and in response to determining that the number of users exceed the predetermined threshold:

determine a target message trigger time based on when the number of users exceed a predetermined threshold;

determine a target message assembly time for assembly the target message and a target message delivery time for delivering the target message to the target device;

determine whether a sum of the target message assembly time and the target message delivery time is less than a difference between a current time and the trigger time; and in response to determining that the sum of the target message assembly time and the target message delivery time is less than the difference between the current time and the trigger time, trigger a sending of the target message to the target device for displaying at the target device.

14. The system of claim 13, wherein the program code executable by the processor to determine the number of users with overlapping target message candidacy based on the locations and the user profiles is further executable to:

determine the number of users with overlapping locations and user profiles that match one or more predetermined parameters corresponding to the target message.

15. The system of claim 13, wherein in response to determining that the number of users does not exceed the predetermined threshold, not trigger the sending of the target message to the target device.

16. The system of claim 13, wherein in response to the triggering of the sending of the target message to the target device, assemble the target message and send the target message to the target device.

17. The system of claim 13, wherein the trigger time comprises a start time and a stop time of when the number of users with overlapping target message candidacy exceeds the threshold.

18. The system of claim 13, wherein the target device comprises the mobile devices of the users with overlapping target message candidacy, wherein the target message is sent to each of the mobile devices of the users with overlapping target message candidacy.

* * * * *